J. LANE.
Wheel-Colter.

No. 213,049. Patented Mar. 11, 1879.

Witnesses.
W. Ottman.
Henry Dewitz.

Inventor.
John Lane

UNITED STATES PATENT OFFICE.

JOHN LANE, OF HYDE PARK, ILLINOIS.

IMPROVEMENT IN WHEEL-COLTERS.

Specification forming part of Letters Patent No. 213,049, dated March 11, 1879; application filed November 4, 1878.

*To all whom it may concern:*

Be it known that I, JOHN LANE, of Hyde Park, in the county of Cook and State of Illinois, have invented a new and useful Improvement in Wheel-Colters, which improvement is fully set forth in the following specification, reference being had to the accompanying drawings.

My invention relates to journaling wheel-colters.

The invention consists in a wheel-colter provided with bosses having a central aperture, closely fitting the axial bolt, and concave or recessed ends, combined with detachable thimbles, which pass entirely through the yoke-arms, and are formed with convex ends, adapted to fit the recesses of said bosses, combined and arranged with an axial bolt and yoke, as hereinafter shown.

Figure 1:
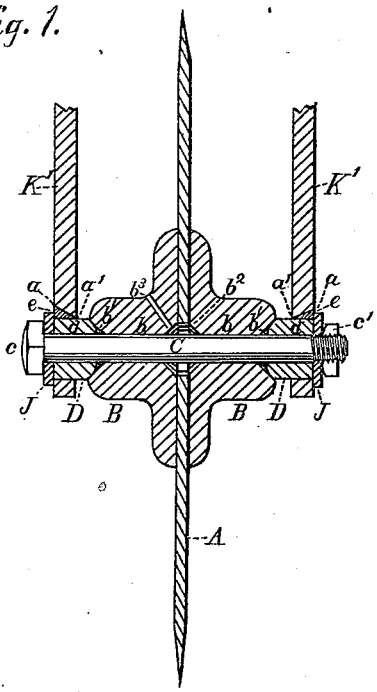
Figure 2:
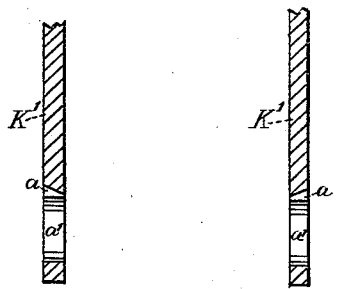
Figure 3:
Figure 4:
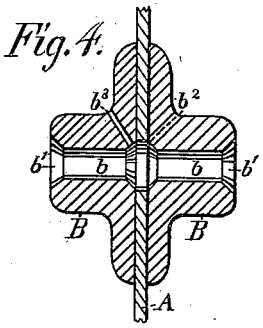
Figure 5:
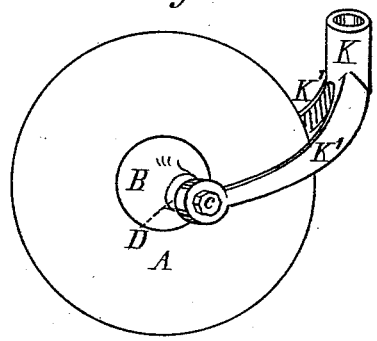

In the drawings, Figure 1 is a central horizontal sectional view through the colter, and a construction of parts embodying my invention, and showing how the thimbles D are arranged to operate as dead-center pivots, bearing in the recess-seats $b^1$ of the bosses B, journaled on the axial bolt C. Figs. 2, 3, and 4 are detail views of the parts as they are shown in Fig. 1. Fig. 5 is a perspective view of a wheel-colter connected to a yoke, by which it is connected to a plow.

Referring to the parts by letter, A is an ordinary wheel-colter, with bosses B B, which form a hub, secured one to each of its sides. $b$ is a cylindrical aperture through the bosses B, which is of a size to closely fit the axial bolt C and have journal-bearing thereon, as in ordinary colters. $b^1$ are concave recesses formed in the ends of the bosses, as shown plainly at Figs. 1 and 4. The surfaces of aperture $b$ and recesses $b^1$ are preferably cast on a chill. The recess $b^2$ may be used as an oil-reservoir, and the hole $b^3$ as an oil-feeding hole, as in ordinary use.

D D are the thimbles I use as dead-center pivots after my improved plan, preferably extending through the yoke-arms, and each having a central perforation, $d$, of a size to closely fit the axial bolt C, and a rounded or convex interior end surface seated bearing in the recess-seat $b^1$, as shown at Fig. 1.

The thimbles are preferably cast of hard white iron, and each has a feather, $e$, upon its exterior, which feather seats in a groove, $a$, in the perforation $a'$ in the lower end of the arm $k'$, (when said thimble is fixed in said perforation $a'$,) as shown at Fig. 1, and thus secures the thimble from rotating.

The thimbles D are substitutive, and may be replaced by new ones when broken or worn.

I prefer to construct the thimble D and the recess-seat $b'$ so as to secure a closely-fitting bearing together exteriorly, and to form a space between them interiorly, as shown at Fig. 1, whereby oil is held as in a reservoir, and the close-fitting exteriors exclude soil-grit. The perforation $d$, being close-fitting to the bolt C, excludes soil-grit and keeps the thimble in its correct position, so that it cannot move from its seat in the recess-seat $b^1$; and by reason of the bosses B and thimbles D being both close-fitting on the axial bolt C, the thimble D will keep its place, seated in the recess-seat $b^1$, under all strains or springing of the bolt C, or loosening of the nut on the bolt C, whereby soil-grit is kept excluded, and the colter kept in true running under heavy strains, more effectually than by any other known construction.

Washers J J may be used on the outer ends of the thimbles D to keep them in position in the yoke-arms.

K represents the upper end, and K' the lower and bifurcated ends or arms, of an ordinary form of yoke for connecting a wheel-colter to a plow.

C is an axial bolt extending through the parts, as shown at Fig. 1, and any wear of the parts may be taken up by screwing up the nut on the bolt.

What I claim is—

The wheel-colter A, provided with bosses B, having aperture $b$, fitting closely upon axial bolt C, and concave ends or recesses $b^1$, in combination with detachable thimbles D, passing entirely through the yoke-arms, and formed with oval or convex ends, adapted to fit the recesses of said bosses, as shown, yoke-arms K', and axial bolt C, all constructed to operate as described.

JOHN LANE.

Witnesses:
FRANK M. WILSON,
FRANK W. BARKER.